(12) United States Patent
Rudoy et al.

(10) Patent No.: US 9,188,181 B2
(45) Date of Patent: Nov. 17, 2015

(54) MOTORCYCLE BRAKE DISC ROTOR

(76) Inventors: Igor Georgievich Rudoy, Moscow (RU); Aleksandr Yurievich Romanov, Balashikha (RU)

( * ) Notice: Subject to any disclaimer, the term of this patent is extended or adjusted under 35 U.S.C. 154(b) by 0 days.

(21) Appl. No.: 13/977,742

(22) PCT Filed: Dec. 28, 2011

(86) PCT No.: PCT/RU2011/001035
§ 371 (c)(1),
(2), (4) Date: Jul. 1, 2013

(87) PCT Pub. No.: WO2012/091635
PCT Pub. Date: Jul. 5, 2012

(65) Prior Publication Data
US 2013/0284549 A1    Oct. 31, 2013

(30) Foreign Application Priority Data
Dec. 30, 2010  (RU) ................. 2010154188

(51) Int. Cl.
*F16D 65/12*     (2006.01)
*F16D 65/02*     (2006.01)
*F16D 69/00*     (2006.01)

(52) U.S. Cl.
CPC .............. *F16D 65/128* (2013.01); *F16D 65/12* (2013.01); *F16D 2065/132* (2013.01); *F16D 2065/1328* (2013.01); *F16D 2069/004* (2013.01)

(58) Field of Classification Search
CPC ..... F16D 65/12; F16D 65/128; F16D 65/847; F16D 13/72
USPC ...... 188/218 XL, 264 R, 264 A, 264 AA, 17, 188/18 A, 18 R
See application file for complete search history.

(56) References Cited

U.S. PATENT DOCUMENTS 3,623,579 A * 11/1971 Hendrickson et al. .. 188/218 XL
4,062,427 A    12/1977 Klaue
(Continued)

FOREIGN PATENT DOCUMENTS

DE    3432926    3/1986
EP    1016803    7/2000
(Continued)

*Primary Examiner* — Vishal Sahni

(57) ABSTRACT

The invention relates to motorcycle brake disc rotors. The technical result of the claimed invention is an improvement in the manufacturability of a ventilated rotor having internal through cooling channels, a reduction in the weight and moment of inertia of said rotor and an increase in the cooling rate thereof. The technical result is achieved in that, in the motorcycle brake disc rotor, which constitutes an annular body having opposite annular frictional surfaces, a radially external lateral surface and a radially internal lateral surface and internal through cooling channels passing from the radially external lateral surface to the radially internal lateral surface, the annular body is formed from at least two layers, wherein the above-mentioned at least two layers of the annular body are rigidly connected to each other and each layer constitutes a component premanufactured separately and integrally, wherein the frictional annular surfaces at least partially form outwardly facing sides of the outer layers of the annular body while the inwardly facing sides of the outer layers of the annular body have areas directly in contact with the adjacent layer and areas free from contact with the adjacent layer, wherein the above-mentioned outer layer areas directly in contact with the adjacent layer serve for the above-mentioned rigid connection of the layers, and each of the internal through cooling channels is at least partially formed by that area of one outer layer which is free from contact with the adjacent layer and by that area of the other outer layer which is free from contact with the adjacent layer.

17 Claims, 5 Drawing Sheets

(56) References Cited

U.S. PATENT DOCUMENTS

| | | | |
|---|---|---|---|
| 4,263,992 A * | 4/1981 | Moore et al. | 188/218 XL |
| 4,448,291 A * | 5/1984 | Ritsema et al. | 188/218 XL |
| 4,853,574 A * | 8/1989 | Estaque | 310/105 |
| 5,005,676 A * | 4/1991 | Gassiat | 188/218 XL |
| 6,405,839 B1 * | 6/2002 | Ballinger et al. | 188/218 XL |
| 2006/0219500 A1 * | 10/2006 | Lu et al. | 188/218 XL |
| 2008/0264741 A1 | 10/2008 | Fujita et al. | |
| 2011/0056777 A1 * | 3/2011 | Woychowski et al. | 188/218 XL |

FOREIGN PATENT DOCUMENTS

| | | | |
|---|---|---|---|
| FR | 2927389 | | 8/2009 |
| JP | 57127132 | * | 8/1982 |
| JP | 03249436 | * | 11/1991 |
| RU | 2370682 | | 10/2009 |
| SU | 1686238 | | 10/1991 |

* cited by examiner

MOTORCYCLE BRAKE DISC ROTOR

RELATED APPLICATIONS

This application is a National Phase of PCT Patent Application No. PCT/RU2011/001035 having International filing date of Dec. 28, 2011, which claims the benefit of priority of Russian Federation Patent Application No. 2010154188 filed on Dec. 30, 2010. The contents of the above applications are all incorporated by reference as if fully set forth herein in their entirety.

FIELD AND BACKGROUND OF THE INVENTION

The claimed invention relates to rotors of motorcycle brake discs.

It is known that, when braking a motorcycle, a main part of the load (up to 75% and even more) is applied to the front wheel, and, consequently, the front wheel brake is loaded much more than the rear wheel brake. Therefore, the front brake disc is heated significantly greater than the rear brake disc during braking, and it is the reason that explains difference in structure of front and rear brake discs of modern motorcycles.

Front brake discs have a greater external diameter (300-330 mm) and consist, as a rule, of a rotor having a width about 35 mm and a thickness from 4 to 7 mm (usually, 4.5-6 mm), to which surface a braking force from brake pads is applied directly, and an aluminum carrier ("spider") that is used for fixation of a brake disc on the front wheel. As the material of the motorcycle brake disc rotor to which the requirements of a stable and rather high (as a rule, from 0.3 and higher) friction coefficient with the pads in a broad temperature range, minimum wear, high rigidity and corrosion resistance are applied, a stainless steel, usually of martensite class (of 20X13 type in Russia or Steel 420 according to AISI, USA) is mostly used. The aluminum carrier ("spider") of the front brake disc is connected to the rotor either by a rigid tie, and then the whole brake disc is a rigid structure, or so called "floating" discs are used, and then the hub is connected to the rotor through special bushings. In the latter case a steel rotor, which is heated significantly during braking (up to 500° C. or more) and expands due to heating, practically does not deform itself and does not deform the aluminum carrier, and the flat form of the rotor is maintained due to moving in a "floating contact", which is principally important during braking.

The use of such a composite structure for the motorcycle front brake disc enables not only to decrease its weight, but also reduce heating of the carrier of a brake disc (and the wheel itself), since heat transfer from the rotor heated during braking through floating contacts is significantly poorer.

The rotor of the motorcycle rear brake disc experiences significantly lower heat load. As a result, rear brake discs are of a smaller size (external diameter, as a rule, is not more than 220-230 mm) and represent, actually, a simple steel rotor with a thickness ranging from 4 to 7 mm (preferably about 5 mm) on which mounting holes are arranged for fixing the rotor on the rear wheel.

Many producers manufacture motorcycle front and rear brake discs comprising, as the main working element, a brake disc rotor. On the whole, except for several parts of their designs, motorcycle front and rear wheel rotors correspond to the above description. In particular, FIG. 1 shows examples of brake discs and rotors for motorcycle front and rear wheels, which are produced by Spacek Product company (Czech Republic, website: wwwdotgoldfrendotcom). Using of through slots (holes) should be noted that are made in the axial direction (transversely to the rotor friction surfaces), and/or transverse grooves on the rotor friction surface that are made, as a rule, in the radial direction and are used for removing dust and pad erosion products. The edges of such holes (grooves) are dust removers and act so as to cut pressed pad dust and discard it to the outside. A specific form of slots (holes) or grooves may differ and is determined by the requirements of sufficient strength and rigidity of the rotor as well as by aspects of visual attractiveness of the rotor design.

Thus, the known rotors of the motorcycle brake discs are an annular body having opposite annular friction surfaces as well as radially external and radially internal lateral surfaces. A distance between the flat friction surfaces (i.e., a rotor thickness) is 4-7 mm, preferably 5-6 mm, a distance between the radially external and radially internal lateral surfaces (i.e., a rotor width) usually corresponds to a width of a brake pad, is approximately 25-35 mm, and may be varied in the circumferential direction (see FIG. 1). As a rule, a plurality of through slots in the rotor axial direction and/or grooves in the radial direction is made in a rotor, but in any case a motorcycle brake disc rotor is a one-piece article made of one blank. In a majority of cases this blank is a sheet of heat-resistant stainless steel, and in some cases ceramic (composite) rotors are applied.

Conventional technical solutions enable to reduce a weight of a motorcycle brake disc rotor (and a brake disc on the whole) to a certain extent without the losses in braking performance, but the weight of rotors and their moment of inertia remain rather big, especially in view of the fact that rotors relate to motorcycle unsprung components which weight reduction is particularly important. A weight and a moment of inertia of a rotor have a significant effect on dynamics and maneuverability of a motorcycle (e.g., an angular velocity of wheel axis turn, which is also associated with motorcycle turn speed, depends on a wheel moment of inertia), and on fuel consumption, and, therefore, rotor weight reduction is very important.

A significant shortcoming of conventional rotors is their considerable heating in hard braking modes, especially during sporting events as well as in hot weather. It is for the purpose of preventing a braking fluid from overheating (since such overheating may cause brake failure) the rotor weight and dimensions are to be increased. An increase of the dimension, i.e., a surface area of a brake disc rotor, increases its cooling rate, but this causes a fast increase of a moment of inertia which for practically permanent thickness and width of a rotor is proportional to the third power of its radius.

An incident airflow cools conventional brake disc rotors in the laminar flow mode. Actually, the Reynolds number Re for air flowing around a rotor is determined by the expression Re=(V*L)/v, where V is a velocity of an incident airflow, L is a rotor ring width, v is air kinematic viscosity. Since L is app. 3 cm, v is app. $2.5*10^{-5}$ m$^2$/s (in the temperature range from 50 to 350° C. kinematic viscosity raises from $1.*10^{-5}$ m$^2$/s to $5.5*10^{-5}$ m$^2$/s), then, even at the speed of 180 km/h (50 m/s) Re<$6*10^4$. But a laminar flow becomes a turbulent flow at Reynolds number Re>$3*10^5$ Yudin, B. N. "Technical Thermodynamics. Heat Transfer" (in Russian). M.: Higher School Publishers, 1988. 479 pages; p. 276).

Heat transfer in the laminar mode is comparatively inefficient. Transition to the turbulent mode of flowing around would enable to increase cooling speed significantly, but a ten-times increase in an incident airflow velocity or, practically, ten-times increase in rotor dimensions is impossible.

Slots and holes in conventional rotors, while improving operation of braking pads, only reduce an efficient area of heat exchange with the ambient air without significant turbulizing an airflow (which would improve a cooling mode).

And it is a rotor cooling speed that mainly determines rotor dimensions and weight, that is, if cooling conditions are better, then rotor dimensions may be decreased, and, correspondingly, a weight and, especially, a moment of inertia of a brake disc could be reduced too. Furthermore, at a significant lowering of a rotor maximum temperature during operation due to better cooling (e.g., to 300° C.) it may become possible to use light alloys for rotors (perhaps with corresponding coatings providing, first of all, a required friction coefficient and wear resistance for brake pads), which would contribute to a sharp decrease of a brake disc weight without significant complicating the technology of manufacturing a brake disc.

A significant improvement in brake disc cooling efficiency may be achieved, if a rotor has internal through cooling channels going from the radially external lateral surface to the radially internal lateral surface and serving for inside cooling the rotor annular body.

It is essentially important for the said high efficiency of heat exchange with an incident air in the internal through cooling channels of a rotor that such channels are made in a rather fast rotating part, since, if through channels of similar section and length (the relation between a channel length to minimum transverse size is 10 to 15) are immovable, no turbulization of an airflow takes place, and heat removal is inefficient ([1]; p. 294).

Actually, at an incident airflow speed V and a channel downstream length (i.e., in fact, a rotor width) L a characteristic time during which a given air portion is in a channel is $T \approx L/V$. The time, during which a rotor, due to its rotation, will move by the channel length, is $\tau \approx \delta/V_1$ where: $\delta$ is a characteristic transverse size of a channel (its "width" in the circumferential direction, a channel may have a variable width); $V_1$ is an average circumferential speed of a rotor. For a real rotor having an annular shape with a relatively small width in comparison to an average radius, which rotor rotates jointly with the wheel, the following relation is correct for V1: $V1 \approx V \cdot (R_r/R_t)$, where $R_r$ and $R_t$ are an average rotor radius and a motorcycle tire radius, respectively. The condition of collision of an airflow passing through a channel with the channel side walls has the obvious form $\tau < T$, and, by using the above expressions, it is possible to find the condition for the parameters of rotor channels:

$$\delta < L(R_r/Rt) \quad (1)$$

For rotors of front brake disc of modern motorcycles of a rather high level the relation $R_r/R_t$ is ~0.45 (Rr is ~155 mm, Rt is ~330 mm), an average rotor width L is ~30-35 mm, and it can be found from the relation (1) that $\delta < 15$ mm. For rotors of rear wheel brake discs the relation Rr/Rt is smaller and equals to ~0.35, which at the same average rotor width gives the condition for a channel transverse size $\delta < 10$-11 mm.

At the optimal (also see below) channel transverse width of ~5 mm the formulated condition (1) is complied with twofold reserve, and the possibility of colliding with the "vertical" channel walls only increase turbulization of a flow in the internal through cooling channels.

The geometric parameters of the internal through cooling channels are determined by the operating conditions of a motorcycle brake disc rotor, first of all by the requirement of sufficient local rigidity of the vertical walls of these channels (a thickness of the channel vertical wall is the thickness of a solid material layer "over the channels", which adjoins the rotor friction surfaces that are acted on, i.e., pressed by brake pads), as well as by the requirements to the whole rotor rigidity at its preset dimensions (it is already said above that the diameter of a brake disc rotor for the motorcycle front wheel is ~320 mm, the thickness is in the range of ~5-6 mm) and by the expediency of decreasing a rotor weight. As a result, a range of possible parameters of the internal through cooling channels is limited irrespective of a specific variant of making them.

Thus, a deflection of the vertical walls of the internal through cooling channels under the pressure exerted by the brake pads is increased in direct proportion to the fourth power of the channel width and in inverse proportion to the third power of thickness of its vertical walls. As a result, a minimum thickness of the vertical walls of such channels is 1 mm, which determines the channel maximum height of 5 mm (for the integral rotor thickness of 7 mm), and an optimal channel height for the currently common rotors having a thickness app. 5 mm is 2-3 mm. Similarly, in order to ensure a rather high local rigidity of a rotor (rigidity in the area "over the internal through cooling channels"), a preferable width of these channels is in the range from 3 to 8 mm. In such a case a number of internal cooling channels in a rotor is 60-100.

The relation between the channel width and the channel wall width or, which is the same, the relation of a distance between the axes of neighboring internal through cooling channels to a characteristic width of a channel (since the channel shape may differ from the rectangular one) is determined, on one hand, by the condition that a surface area that actually ensures a friction force should be rather great. On the other hand, if a channel width is small in comparison to a distance between the axes of neighboring channels, then a volume of maximum efficient heat removal is reduced as well as a rotor weight is changed insignificantly. The joint action of these two opposite factors leads to the condition that the relation of a distance between the axes of the internal through cooling channels to their width does not exceed 4, preferably does not exceed 2.

A minimum width of the internal through cooling channels is, preferably, ~1 mm and is determined by the two factors:
- the technological factor: at a smaller channel width and an optimal relation of the width and a distance between the axes of such neighboring channels their number in a rotor becomes too great; thus, when the distance between the channel axes is 2 mm, their number in the brake disc rotor of the front wheel exceeds 400;
- the operational factor: channels of small section are easily clogged with dust and contaminants, they are more difficult to be cleaned, when necessary.

Similarly, a minimum channel height is determined by the operational reasons as well as by a reduction of heat removal efficiency in an internal through cooling channel (since a share of such channels in the rotor section becomes insignificant) and, practically, by maintenance of a rotor weight; the preferable height of the internal through cooling channels is at least 1 mm.

Thus, in order to ensure a significant weight and moment of inertia reduction for a ventilated rotor having internal through cooling channels with maintenance (or small change) of its full thickness, it is advisable to make ~50-80 such channels with a characteristic width of ~3-6 mm and a height of 2-3 mm in such a rotor. A greater height of the channels will inevitably lead to increase in the full thickness (height) of a rotor, which is, in principle, possible, but will require to alter (modernize) brake system supports currently used.

Various embodiments of a brake disc rotor with internal through cooling channels are proposed in the following patents ([2]: Fr 2927389; [3]: EP 1016803), Patent [2] relates to brake disc rotors of motorcycles and cars, and Patent [3] relates to brake disc rotors of bicycles.

Since it seems technically unreal to make such channels with a height not more than 2.5-3 mm (when the full thickness of a rotor is app. 5 mm) and a length app. 30 mm (corresponding to a rotor width) in one-piece article at a reasonable price of the finished article and subject to the fact that a number of channels in one rotor should by app. 60 or more, Patents [2], [3] propose to make brake disc rotor (or a whole brake disc) components manufactured separately.

Patent [2] proposes a brake disc with internal through cooling channels, where two annular friction surfaces are the external surfaces of two parallel steel plates kept at a distance from each other by spacers that are welded to the inner sides of these plates, which ensures rigid connection of the rotor elements to each other. In particular, such spacers may be rods of rectangular section that are arranged essentially radially (FIG. 15 in [2]), and this embodiment just forms internal through cooling channels going from the radially external lateral surface to the radially internal lateral surface of the rotor.

The proposed embodiment of the rotor provides a significant improvement in its cooling, but has extremely low manufacturability due to a great number of constituent elements, is difficult in assembling and practically does not ensure a reduction of the rotor weight. Indeed, in order to provide required rigidity of the rotor outer layers during braking with a small number of spacers, it is necessary to increase the thickness of the said outer layers significantly and, respectively, the rotor weight (that may even exceed the weight of a solid rotor), and with rather thin friction layers it is necessary to use a great number of spacing rods (~70 or more rods with a length of ~30 mm and a section of ~4*2.5 mm), which is extremely non-practicable from the technological point.

Indeed, when making a rotor according to [2], it is necessary, at first, to arrange precisely all spacing rods (~70 pieces!) on the inner side of one (the first) of two steel plates, to weld all the spacers to this plate, while ensuring that the metal will not be splashed or pressed out to the opposite sides of the spacers, to which the inner side of the second steel plate will then be welded. The presence of a splash of the metal or the pressed-out metal will cause (after welding of the second plate) mutual obliquity of the plates, the presence of local stress concentrators, etc. Obliquity may be corrected by grinding or milling the welded rotor as a one-piece article, but appeared concentrators may not be removed. Therefore, apart from other operations, control and additional treatment of the welded spacer free surfaces will be required after the first stage of welding, and, evidently, assembly and precise positioning of a great number of elements complicate the manufacturing of the rotor according to [2] also.

Patent [3] proposes a method for making a ventilated brake disc for a bicycle, which has internal through cooling channels, where a corrugated plate that is made by deforming in one operation is used as a spacer between the rotor outer flat layers, this corrugated plate has circumferentially alternating projections and recesses. All the three elements (layers) of this proposed rotor are made of stainless steel, and rigid connection of the rotor components is ensured due to using a nickel bonding paste in the areas of contact between the outer plates with a spacer and subsequent heating the whole assembly to a temperature above the austenitic transition temperature.

The side walls of the internal through cooling channels in this rotor are inclined regions of the corrugated intermediate layer that connect the projections and recesses, and the other two (vertical) channel walls (along the rotor thickness or axis) are, on one side, the inner (relative to the rotor) surface of the intermediate layer and, on the other side, the inner surface of the outer layer. That is, the thickness of the channel vertical wall on one side is equal to the thickness of the outer plate, and the thickness of the channel wall on the other side is equal to the sum of the outer layer thickness and the thickness of the plate which the corrugated intermediate layer is made of.

In this embodiment of a ventilated rotor the height of the internal through cooling channels is determined by the relation $$h = H - d, \quad (2)$$

where: H is the full height of a corrugation, d is the thickness of a plate which a corrugated spacer is made of. For the rotor described in [3] H=3.2 mm, d=0.6 mm and the channel height is 2.6 mm, the side walls of the corrugated intermediate layer have approximately the same height (length). The proposed embodiment of the rotor simplifies its assembly significantly, but, in spite of improved cooling mode, it does not enable to reduce the weight of the whole rotor even for a bicycle (see below). In particular, the inventors of [3] describe a ventilated rotor which outer layers are formed by plates having the thickness of 0.8 mm, and the corrugated spacer is made of a plate with the thickness of 0.6 mm. Since the whole area of the corrugated spacer, as follows from description of its shape in [3], is significantly greater than the area of the outer layers, the weight of this rotor knowingly exceeds the weight of a similar solid rotor with the thickness of 2.2 mm. At the same time, a thickness of modern non-ventilated brake discs is usually 1.8-2.2 mm. Correspondingly, a greater rotor weight automatically ensures its lower heating during braking even without internal cooling channels.

Furthermore, the proposed ventilated brake disc rotor has significantly greater dimensions; thus, the full thickness of the rotor proposed in [3] is 4.8 mm, which is app. 2.4 times greater than the thickness of standard brake discs.

Further, it is to be taken into account that in the proposed embodiment of the ventilated rotor the rigidity (including local one) is practically fully determined by rigidity of the corrugated intermediate layer, first of all by the height of the corrugation itself and the thickness of its side walls. Correspondingly, if this known technical solution is used in a brake disc rotor for a motorcycle, the corrugated intermediate layer rigidity should be increased many times, since pressure exerted by brake pads on rotor friction surfaces is significantly greater during braking a motorcycle than a bicycle. Moreover, with growing pressure exerted by pads tangent stresses are also increased in points where the intermediate layer is connected to the outer layers (apart from stresses arising due to friction of pads on friction surfaces), which reduces the lifetime of the assembled construction.

Then, with increasing a thickness of the source plate which is used for forming the intermediate layer, the making of a structure corrugated circumferentially is sharply complicated. Calculations show that a thickness of inclined (lateral) parts of a corrugated structure in the brake disc rotor for a motorcycle should be at least ~1.6 mm. In such a case, in order to obtain the height of 2 mm of the internal cooling channels, it is necessary to ensure that the full height of the corrugation is H>3.6 mm. The making of such a part is extremely complex technological task for a rather thick source plate, especially with regard to anisotropy of its plastic properties and different degree of plate deformation at different distances from its axis, and the making of a deformed corrugated structure for forming a rotor with channels of complex section becomes practically unreal. Subject to a thickness of the rotor outer layers>1.4 mm (in a case of a motorcycle), the full thickness of the rotor becomes >6 mm (>6.4 mm), which significantly exceeds the dimensions of modern non-ventilated rotors, and the weight of the known ventilated rotor is not less than the weight of quality standard rotors.

Furthermore, local heating of opposite regions of the known rotor, especially at the initial braking stage, differs significantly due to a multiple difference of heated metal thicknesses of a rotor at practically similar heat release on both friction surfaces, which causes additional thermal stresses and provokes geometric changes (distortions) of the ventilated rotor proposed in Patent EP 1016803.

Thus, the known ventilated brake rotors with internal through cooling channels are not manufacturable and do not ensure a weight reduction for a motorcycle brake disc rotor.

SUMMARY OF THE INVENTION

The technical effect of the claimed invention is improvement of manufacturability of a ventilated rotor with internal through cooling channels together with reduction of its weight and moment of inertia as well as increasing its cooling speed.

This technical effect is achieved due to the fact that the motorcycle brake disc rotor is proposed that is an annular body having opposite friction annular surfaces, a radially external lateral surface and a radially internal lateral surface, internal through cooling channels for cooling the annular body on the inside that extend from the radially external lateral surface to the radially internal lateral surface, the annular body is made of at least two layers, the said at least two layers of the annular body being rigidly connected to each other, and each of them being a part preliminarily made separately as a whole piece, the annular friction surfaces form, at least partially, the facing outward sides of the annular body outer layers, while the facing inward sides of the annular body outer layers have regions directly contacting the adjacent layer and regions free from contact with the adjacent layer, the said outer layer regions directly contacting the adjacent layer serve for the said rigid connection of the layers, and each of the internal through cooling channels, at least partially, is formed by a region free of contact with the adjacent layer of one outer layer and a region free from contact with the adjacent layer of the other outer layer.

According to the claimed technical solution, the vertical walls of the internal cooling channels are the rotor outer layers, and the internal cooling channel side walls are either inclined regions of the rotor outer layers (this is the only possibility when a brake rotor consists just of two layers and they are adjacent to each other), or the side walls of through slots in the flat intermediate layer that are free from contact with the adjacent layer, and, if provided for, the inclined regions of the outer layers. Thus, in preferred embodiments that are described in detail below the ventilated brake rotor consists of two or three elements, i.e., two outer layers and, possibly, a flat intermediate layer that provides maximum local rigidity of the disc in comparison to other (non-flat) shapes of the intermediate layer as well as the symmetry of the rotor relative to its central plane.

The advisable geometric parameters of the internal through cooling channels, including those for this technical solution are described above. According to the claimed invention, the internal through cooling channels may be made straight and may extend in essence radially from the radially external lateral surface to the radially internal lateral surface of the rotor. However, in a preferred embodiment of the invention the channel directions may differ from radial ones. For the purpose of additionally improve heat exchange, the axes of the internal through cooling channels may be directed at an angle to the radius vector directed from the axis of rotation of the rotor to the corresponding point of the channel axis, this leads both to an actual increase of the channel efficient length and heat exchange with an incident airflow. The channels may be made non-straight, they may curve, taking into account, for example, a change of the circumferential velocity of the rotor proportionally to a distance to its rotation axis; in the case where the internal through cooling channels are made curved, their length is additionally increased. Furthermore, the section (transverse dimensions) of the channels may vary along the channel length, including periodical changes.

According to an embodiment of the claimed technical solution, the rotor consists of two parts (layers) preliminarily made separately as one piece, each of them being the outer layer, and these two outer layers are the adjacent layer for each other, therefore the internal cooling channels are fully formed by those regions of the two layers that are free from contact with the adjacent layer.

According to possible embodiment of such the rotor for a motorcycle brake disc, at least one outer layer from two outer layers is used with elements that are substantially U-shaped and extend from the radially external lateral surface to the radially internal lateral surface, each of them forming a recess on one side of the layer and a projection on the other side of the layer, the recesses and the projections on each side of the layer alternating in its circumferential direction. All the projections on the facing outward side of the said outer layer form a friction surface, and all the recesses of this side of the outer layer form the external through cooling channels for cooling the annular body of the rotor on the outside, and all the projections on the facing inward side of this outer layer serve as the said surfaces contacting the adjacent layer for connection to the other outer layer, and all the recesses of this side of the outer layer serve as the said regions free from contact with the adjacent layer, each of them together with the respective, free from contact with the adjacent layer, region of the other outer layer forms the respective internal through cooling channel.

Hereinafter the said layer will be called "the layer with substantially U-shaped elements".

According to preferable embodiment of the rotor, the other outer layer is made identically to the said layer with substantially U-shaped elements, and both outer layers form the adjacent layer for each other, the said identical layers being preferably arranged so as the recesses, which face each other on the adjacent layers are aligned with each other to form the internal through cooling channels, and the projections, which face each other, on the adjacent layers are rigidly connected to each other.

According to the said embodiment of the rotor, the rigid connection of the projections, which face each other on the adjacent layers may be made by soldering, gluing, welding (including resistance welding, in particular resistance-spot welding) as well as by force closure (e.g., by rivet connection). The characteristic thickness of the layer material is 1.5 mm, and the characteristic transverse dimensions of the friction surfaces in the circumferential direction of the rotor are 5-9 mm (the width of the internal through cooling channels is ~5 mm at a height ~2-2.5 mm, the width in the circumferential direction of the regions rigidly connecting the layers is 3.5-6 mm. As numerical simulation and the results obtained by the authors of the claimed technical solution show, stresses in the rotor material, as created during the operation of the brakes, do not exceed the fatigue limit at such geometric dimensions, and the displacement of the friction surfaces in the direction of the pressure from the brake pads (i.e., perpendicularly to the friction surface) is not more than 3-10 microns and is compensated by elasticity of the brake pads.

The width (in the circumferential direction) of the projections and the recesses of the layer with substantially U-shaped elements as well as the layer material thicknesses in the areas of the projections and the areas of the recesses may differ from each other, optimal values of the said layer parameters are determined by a level of allowable stresses and deformations of the layer friction surface during the operation of the brake pads. In particular, the thickness of the layer material in the area of the outward projections of the rotor (that, in totality, form the friction surface of the rotor) may, preferably, be 1.3-1.6 mm, and the thickness of the layer material in the area of recesses on the outer side (that, in totality, ensure rigid connection between the layers) may be 1.1-1.5 mm; the thickness of the projection and recess side walls is 1.2-1.5 mm; other combinations of the thicknesses are also possible. Similarly, the width (in the circumferential direction) of the projections on the outer side is preferably ~6 mm, and the width of the recesses on the outer side is ~4 mm, at this ratio of the projection and recess dimensions the share of the friction surface area significantly exceeds 50% of the brake pads area, which reduces load on the brake pads. An inclination angle of the projection and recess side walls to the axis of the rotor is, preferably, 5-10° and is determined by the condition of small amount of deformation of the friction surface under pressure of the brake shoes and the condition of limiting stresses, first of all in the regions where the layer side walls pass to flat surfaces; chamfers with a radius preferably 0.3-0.5 mm may be made in these places. The said inclination angles of the side walls are also close to optimal ones when layers are made by either mechanical working (milling), or pressure treatment (punching).

The said parameters of the layer elements, first of all the width of the friction and connecting surfaces as well as the thickness of the side walls, may be varied in the circumferential direction. In particular, as the inventors have found by numeric simulation of the braking process, maximum stresses appear in channels that are neighboring to the places where the rotor is connected to the brake disc carrier (for brake rotors of the front wheel) or to the fixation points of the rotor on the rear wheel (for brake rotors of the rear wheel). For the purpose of compensating the said stress growth the thickness of the side walls of the respective (especially loaded) projections and recesses may be increased, preferably by 15-25%, as compared to average values along the layer circumference.

According to the said embodiment of the rotor, the total thickness of the connected material, which is equal to two thicknesses of the material of each layer in the area of recesses on the outside of the rotor, is, preferably, 2.6-3.2 mm. A connection of the said thickness may be made efficiently and with high productivity by, in particular, resistance welding, including resistance-spot welding. Furthermore, the possibility of using layers rigid connection by resistance (spot) welding in this embodiment has such advantage that the rotor regions subjected to local heating during welding do not contact with brake pads, i.e., the friction surfaces are not subjected to thermal action. Furthermore, since the connected regions of the rotor are distant from the friction surfaces (for example, with the full rotor thickness of 5.2 mm and the total connected material thickness of 3.0 mm the distance to the friction surfaces is 1.1 mm on each side), a rigid connection may be made also by force closure (rivets).

According to a preferable embodiment of the rotor having the outer layers with substantially U-shaped elements, walls of preferably each external through cooling channel are made with developed surface and/or provided with a coating facilitating heat exchange/heat transfer.

The said embodiment provides additional increase in cooling rate of the rotor heated in the process of braking. This result is achieved due to the fact that the efficiency of heat exchange of a developed (rough) surface with an incident airflow increases in comparison to the case of flowing around a smooth surface ([1], p. 296; [4]: Zhukauskas, A. A. "Convective Transfer in Heat-Exchangers". M.: Nauka Publishers, 1982, 472 pages; p. 163). Correspondingly, it is preferable to provide a developed surface for each external through cooling channel (the surfaces of these channels is composed of their side walls and the "bottom"), which may be done by various methods, for example, mechanical working (in particular, with steel wire brushes), shot blasting (with split or cast shot), sand blasting or by chemical methods (etching). A preferable roughness for the wall surfaces of the external through cooling channels is 20-100 microns, and in this case roughness has a significant effect on the boundary layer processes that determine the intensity of heat exchange.

A developed surface for the external through cooling channels may be made either by treatment of the assembled rotor, or by treatment of the rotor components (layers) before assembly, which is preferable if the layers are rigidly connected by, for example, gluing or soldering. Furthermore, due to a developed surface of the internal through cooling channels the efficiency of heat exchange in these channels is further increased.

The making of the external through cooling channels with a developed surface significantly increases the efficiency of cooling the whole rotor due to a great total surface area of such channels (in other words, due to increasing the heat-transfer coefficient for the unit of the initial "geometric" surface). According to preferable embodiments of the rotor, for example, for the front brake disc, even the initial "geometric" surface area of the external through cooling channels (without regard to roughness) is ~300 cm², which is comparable to the surface area of conventional rotors ~600 cm2 (for conventional one-piece rotors with a flat geometry the surface area S that is involved in heat exchange with the air may be estimated according to the formula $S=2M/\rho\lambda$, where M is a weight of the rotor, $\rho$ is a density of the rotor material,) $\lambda$ is its thickness). Subject to the fact that the cooling efficiency of a rough surface may be 1.5-2 times greater than the cooling intensity of a smooth surface, a rotor cooling rate that is comparable to the common cooling rate of conventional one-piece rotors may be achieved only by developing the surface of the external through cooling channels.

The possibility of developing the surface of the external through cooling channels according to this invention is associated with the fact that this surface does not contact brake pads, since the area of contact with pads is automatically smooth. Furthermore, a developed (rough) surface usually has a significantly greater degree of blackness and is cooled due to thermal radiation also. Heat transfer by radiation may play a significant role when a rotor is heated greatly—at 500° C. the power of radiation from the surface of a black body is 2 W/cm², but a blackness degree of the surface of a smooth (polished) stainless steel does not exceed 0.25-0.3 at the working temperatures of a rotor. The surface of the external through cooling channels according to the invention may be additionally treated in order to increase its blackness degree and heat transfer by radiation. An increase in the blackness degree of a surface may be achieved, e.g., by its dull finish (creating roughness) as well as by applying a rather thin coating (typical thickness is several microns) or by painting (for example, with black dull paint when a paint layer thickness is ~20-30 microns); either a coating, or a paint may be applied not only to a smooth surface, but also to a rough surface. As a result, when the blackness degree is close to 1, a heavily heated rotor may be cooled with a rate up to 2 degree per second only due to thermal radiation even in the absence of an incident airflow (when a motorcycle is stopped), which may be comparable to a rate of convective cooling.

The use in the said rotor embodiment of both the internal through cooling channels, and the external through cooling channels, especially the external through cooling channels with a developed surface, ensures a maximum cooling rate for the rotor and, correspondingly, its minimum temperature. The operation at a minimum heating degree enables to compensate an increase of pressure exerted on the friction surfaces of the rotor and the surface of the brake pads, which increase is associated with a reduction of the efficient area of their contact. The layer with substantially U-shaped elements may be made, for example, by machining (milling) of a sheet having a thickness not less than the full height of the layer in an assembled rotor for a motorcycle brake disc, i.e., a sheet having a thickness not less than $\Delta/2$, where $\Delta$ is the full thickness of the assembled rotor (see also below). Furthermore, the said layer may be made by productive methods of forming, for example, sheet punching of a thinner source sheet with a thickness roughly corresponding to the material thickness of the layer prepared for assembly in rotor (~1.5 mm), the forming process should form projections and recesses with the height, preferably, of ~1.2 mm (in order to achieve, after assembly, a height, preferably, of 2-2.5 mm of the internal through cooling channels.

Thus, according to an embodiment of the rotor under the claimed technical solution, which rotor consists of two layers with substantially U-shaped elements, the height of the internal through cooling channels is determined by the formula $$h=2*(H-d) \qquad (3),$$

where symbols correspond to those used in the formula (2), and $\Delta=2H$. That is, when the thickness of a source plate intended for forming a layer with substantially U-shaped elements is 1.5 mm, in order to obtain the height of the internal cooling channels of 2 mm, it is necessary to have the full height H=2.5 mm of each outer layer. It means practically a half height (length) of the layer side walls (H−d=1 mm) in comparison to the height of the intermediate layer side walls in the known rotor [3] according to an embodiment of the known rotor in a motorcycle version at the same height of an internal cooling channel and the same wall thickness. Correspondingly, a half degree of deformation is needed in comparison to the known rotor [3], which substantially simplifies the technology of making this element.

Due to twice as less length of the side walls at the same pressure of the brake pads in the claimed technical solution, significantly less stresses arise in the most loaded profile regions in comparison to the known ventilated rotor [3]. This is conditioned by the fact that at the same rigidity (at the same side wall thickness in both cases, the claimed technical solution and [3], the rigidity of the "corrugated profile" side walls is the same) for twofold arm and moment of an applied force stresses differ in two times and displacements in eight times. Consequently, it is necessary to increase the thickness of the corrugated profile side walls for the embodiment of the ventilated rotor according to [3], which results in a greater weight of the known rotor.

Nevertheless, even a smaller degree of deformation according to the said embodiment of the claimed technical solution (two layers with substantially U-shaped elements) may be hard to realize, and, therefore, according to an embodiment of the rotor an intermediate layer is provided between the outer layers with substantially U-shaped elements, which intermediate layer is the adjacent layer for each of the outer layers and which is made flat, has through slots that extend from the radially external lateral surface to the radially internal lateral surface of the outer layers and each of them forms, together with the respective, free from contact with the adjacent layer, areas of the outer layers the respective internal through cooling channel, the said flat intermediate layer protrudes radially outward beyond the internal lateral surface of the outer layers and/or beyond the external lateral surface of the outer layers.

In such a case, at the preferable thickness of ~1 mm for the intermediate layer and at the preferable thickness of ~1.5 mm for source sheets for the layers with substantially U-shaped elements, in order to obtain the required thickness (usually app. 5 mm) after assembling the rotor, a degree of deformation to form the layers with substantially U-shaped elements may be decreased, i.e., the height of the projections and the recesses may be additionally decreased 2 times—from ~1 mm to ~0.5 mm—(the height H of the internal through cooling channels is still 2 mm), corresponding deformation of a source plate with the thickness of ~1.5 mm may be reliably and stably done during punching that is a highly productive and cost-effective production process.

A decrease of a deformation degree during punching raises stability of the forming source sheet blanks, guarantees the absence of cracks and other defects in a layer ready for assembling in a rotor, a required for punching press effort is reduced significantly, the service life of die tooling is prolonged. At the same time, when assembling a rotor, it is necessary to make a rigid connection of three layers, that is a number of contact surfaces is increased two times in comparison to the embodiment of the rotor when two constituent layers are assembled.

According to the said preferable embodiment of the rotor with a flat intermediate layer and outer layers with substantially U-shaped elements, the flat intermediate layer protrudes radially beyond the internal lateral surface of the outer layers and/or beyond the external lateral surface of the outer layers. This technical solution enables to increase efficiently the rate of heat transfer to an incident airflow from motorcycle brake disc rotor, since an increase in the rotor weight (at the expense of protruding regions of the intermediate layer) ensures favorable for cooling increase in its area. Actually, a growth of the rotor surface is equal to $\Delta S=2\Delta M/\rho\zeta$; where $\Delta M$ is an increase in the rotor weight, $\rho$ is the material density of the intermediate layer, $\zeta$ is the thickness of this layer. Since $\zeta$ is ~1 mm, then, for example, in comparison to conventional one-piece rotors for motorcycle brake discs, which thickness is app. 5 mm, an increase in weight of the rotor with "protruding" intermediate layer according to this invention provides fivefold growth of the surface area.

Furthermore, just these protruding portions of the flat intermediate layer ensure connectivity of this intermediate layer having through slots that extend from the radially external lateral surface to the radially internal lateral surface of the outer layers, which enables to make the said layer as one piece and simplifies assembly of the rotor radically.

Further, according to a preferred embodiment, the intermediate layer surface that protrudes radially outside beyond the internal lateral surface of the outer layers and/or beyond the external lateral surface of the outer layers is made with a developed surface and/or provided with a coating facilitating heat transfer/heat exchange (such embodiments are described above). In this case, similarly to the above description, an additional significant growth in the efficient (from the point of cooling, first of all cooling by an incident airflow) area of the said intermediate layer regions is ensured practically without a further increase in the rotor weight, since when a rough surface is made, its weight is not increased, and in a case of applying thin absorbing coatings or a thin layer of an absorbing paint (in comparison to the intermediate layer thickness) a weight increase of the rotor is minimal.

A flat layer having a required shape and slot arrangement may be made by machining of a sheet with corresponding thickness (by milling), by laser cutting or by a standard procedure of cutting-out in cutting dies.

When making a rotor for a motorcycle brake disc, where the outer layers are those with substantially U-shaped elements, it is advisable that directly after assembling the rotor and connecting its layers rigidly the rotor full thickness is slightly (preferably, by 0.3-0.6 mm) greater than the thickness of the finished article. After assembling, grinding or precise milling is used as the finishing operation during which a near-surface volume of the material is removed to a depth preferably 0.15-0.3 mm from each annular friction surface of a motorcycle brake disc rotor in order to ensure precise parallelism of the friction surfaces and the absence of rotor runout, this also compensates any warpages (deformations), which may occur during connecting the layers into the finished article, and inaccuracies in source blanks and in layers manufactured separately. Deformations may appear, first of all, in variants of rigid connection of the layers that is accompanied by their local or overall heating (thermal deformations), first of all in variants of soldering and welding, while such deformations are minimal when resistance-spot welding is used. Furthermore, sharp edges of the outer layer projections formed in the result of grinding (milling) automatically remove dust and pud erosion products similarly to slots (holes) in conventional rotors for motorcycle brake discs.

According to another one embodiment of the claimed invention, two flat outer layers are provided in a motorcycle brake rotor with a flat intermediate layer. Each of the said layers may be made by machining (milling) of a sheet or punching (die punching) of a sheet with a corresponding thickness, the latter being a more productive process. Through slots (holes) may be made in the outer flat layers for the purpose of removing dust and pad erosion products.

The following sequence of making the rotor comprising two flat outer layers and one flat intermediate layer is possible: preliminary making, separately from each other, each of the two outer layers and the intermediate layer of the rotor, assembling the rotor to the permanent connection, and then finish machining. During the finishing milling or grinding of the outer layers friction surfaces to a depth of, preferably, 0.15-0.3 mm may be carried out in order to ensure precise parallelism of the outer layers and the absence of runouts in the finished rotor; compensation of, among other things, possible warpages (deformations) arising at rigid connection of the layers into the finished article, first of all by local or general heating (soldering, welding), as well as possible inaccuracies (first of all, unstable thickness) in source sheets.

According to an embodiment of the rotor, the intermediate layer may consist of several parts (layers) that are made separately and assembled together during the final assembly of the rotor. The layers making up the rotor are connected into the permanent connection by welding (for example, resistance or seam welding), and/or gluing, and/or soldering, or another similar process.

According to the said embodiment of the rotor for a motorcycle brake disc, the side walls of the internal through cooling channels form side walls of slots in the intermediate layer, and the vertical walls of the said channels form regions of the outer layers, which are free from contact with the adjacent (intermediate) layer. The rest portion of the intermediate layer material, which is between the flat outer layers, performs the function of "reinforcing ribs" which support and through which the flat outer layers are rigidly connected into one piece. Calculations of the said embodiment for strength and, first of all, for rigidity enable to determine preferable parameters of the through cooling channels: the height of 1.8-2.5 mm (corresponds to the thickness of the intermediate layer), the width of 4-7 mm (corresponds to the width of the slots in the intermediate layer), the preferable width of the "reinforcing ribs" of ~5 mm. The width of the "reinforcing ribs" as well as a distance between them may vary (in particular periodically) in the circumferential direction, taking into account stress distribution in working rotor.

When determining an optimal width of the channels and a distance therebetween (that is, a distance between the axes of neighboring internal through cooling channels), it is necessary to take into account that a friction force is actually generated, first of all, in the area of close contact between the friction surfaces and the brake pads, and it is advisable that a rather high number of pairs "channel—reinforcing rib" is arranged under the brake pads. For the typical longitudinal size of modern brake pads, which is equal to app. 50 mm, the dimension of the pair "channel—reinforcing rib" of 8-11 mm is preferable.

The width of "reinforcing ribs" is also determined by the fact that namely through them is provided the connection of all the layers making up the rotor as a single piece, and an area of contact is limited by a minimum value depending on the type of rigid connection. For example, if resistance-spot welding is used that ensures efficient connection of the rotor three layers with the total thickness of app. 5 mm, a diameter of a cast core, if the process is carried out correctly, is at least ~3.5 mm (preferably 4-4.5 mm), and, when the width of the intermediate layer "reinforcing ribs" is smaller, melted metal splash into various sides is possible that may cover the respective internal through cooling channel.

The making of at least one flat intermediate layer so as it can protrude radially outward beyond the internal lateral surface of the outer layers and/or beyond the external lateral surface of the outer layers, as it is discussed above, enables to increase the cooling area due to the respective regions of the flat intermediate layer to a greater degree than the rotor weight is increased.

Further, according to a preferred embodiment, the intermediate layer surface that extends radially beyond the internal lateral surface of the outer layers and/or beyond the external lateral surface of the outer layers is made with a developed surface and/or provided with a coating facilitating heat exchange/heat transfer (variants of it are described above). In this case, as already said, additional significant growth in the efficient (from the point of cooling, first of all, by an incident airflow) area of the corresponding intermediate layer regions is achieved practically without further increasing the rotor weight.

The possibility of developing the said region surfaces of the flat intermediate layer is conditioned by the fact that the intermediate layer does not contact brake pads. A surface may be developed, for example, by shot blasting either before assembling the rotor constituent parts into a one piece (in such a case roughness of the surface of the internal through cooling channels will be ensured automatically), or after rigid joining the rotor constituent layers into a single whole, but before finished machining of the rotor friction surfaces.

The described embodiments of at least one flat intermediate layer enable to further improve a rate of cooling of ventilated rotor with internal through cooling channels.

According to those embodiments of motorcycle brake disc rotor, where the rotor consists of outer layers and at least one intermediate layer, the material of the said let one intermediate layer may be a material of a less density and/or greater thermal conductivity than the outer layer material. This possibility is associated with the fact that a material for intermediate layers of the rotor may be selected without regard to tribotechnical requirements (wear rate and value of friction coefficient) that are principal for outer layers of the rotor that make up a friction surface and contact brake pads.

In order to improve heat exchange conditions and create more uniform temperature field in the rotor (in this case thermal deformations are reduced also), the intermediate layer of the rotor may be made of a material with greater thermal and temperature conductivities than a material of outer layers of the rotor. For example, the coefficients of thermal and temperature conductivities of Steel 20 which characteristics are sufficient for making an intermediate layer is practically twice (1.9 times) as much than that of stainless steels which are usually used in modern rotors and may be used for making outer layers.

Further, for the purpose of reducing a weight of the rotor the intermediate layer may be also made of a material having lesser density than a material for outer layers of the rotor, for example, of titanium alloys withstanding reasonably high temperatures. At a high cooling speed of the rotor according to the claimed invention and moderate temperature of its heating the intermediate layer may be made of high-temperature aluminum alloys or of sintered aluminum powders (SAP type alloys), and the latter variant is more preferable in comparison to aluminum alloys, since the SAP thermal expansion coefficient is close to that of steels. In order to rigidly connect dissimilar materials, one may use gluing, force closure (for example, riveting, especially in a case when outer layers are the layers with substantially U-shaped elements) as well as soldering for some combinations of metals used for the intermediate layer and the outer layers.

According to a preferable embodiment of the motorcycle brake disc rotor, the internal through cooling channels either have invariable cross-section, or are made with variable cross-section, e.g., preferably expanding from within to outward.

An increase in the cross-section of the internal through cooling channels on the radially external lateral surface of the rotor enables to "catch" in these channels more incident air, which is rational since heat exchange in the internal through cooling channels is more efficient than on the external surface of the rotor. Such "catching" mode may be realized by expanding the internal through channels as they come closer to the radially external lateral surface of the rotor.

If a width of the internal through channels is increased, deformations of the rotor friction surfaces as well as the rotor stresses appearing under the influence of friction and pressure forces from the brake pads are also increased. Therefore, the channel width may be increased, as compared with the optimal values, first of all in the area where the brake pads do not exert pressure to the rotor or in a minimum part of the rotor working area. Consequently, it is preferable to increase the width of the channels within 2-3 mm from the radially external lateral surface of the rotor. A preferable increase in the width of the internal through channels is not more than 1.5 mm for 1 mm of the decreasing distance to the external lateral surface of the rotor. The said parameters of increasing the width of the internal through cooling channels enable to significantly increase the total area of the section where incident air enters the channel, and already at a distance ~2 mm from the external side boundary of the rotor the channel parameters become optimal for operating in the friction pair with the brake pads. As a result, the main part of the rotor friction surface ensures braking in the optimal conditions. More abrupt increase of the channel section leads to the situation when a part of an incident airflow is rejected outside by the walls of the internal through cooling channel and does not pass into the rotor through channels.

Furthermore, according to this invention the section of the through channels in the motorcycle brake disc rotor (both internal and external ones) in the main part of the channel length may be made variable, in particular, at the expense of projections on the channel walls their height and/or width may vary, and according to a preferred embodiment, the channel width varies periodically. Such periodic variation of the channel width, preferably within +/−3-5% of the average value (i.e., +/−0.15-0.3 mm for the typical channel width b ~5-6 mm) with a period, preferably, (0.5-1)*b (i.e., 3-6 mm) leads to a significant increase in heat transfer ([4], p. 429; [5]: Leontiev, A. I., Olimpiev, V. V. "Influence of Heat Transfer Intensifiers on Thermal-Hydraulic Properties of Channels"; Thermal Physics of High Temperatures", v. 45, No. 6, 2007, pp. 925-953; pp. 926, 927). Such variation of the channel width (section) has practically no effect on rigidity, stresses and deformations in the rotor, which enables to carry it out on the main part of the channel length. At the same time, "discreetly rough channels" enable to ensure a heat transfer gain of ~25% in the turbulent mode of flowing around (in this case a variation in the channel width is, preferably, 2-4% of the channel average width b with the period corresponding to (0.5-1)*b) and several times in the case of laminar mode; in the latter case the preferable variation of the channel width is ~0.1*b, and the variation period is ~0.7*b OD.

Further the invention will be explained with examples, which do not, however, limit the invention, with reference to the accompanying drawings, wherein:

DESCRIPTION OF SPECIFIC EMBODIMENTS OF THE INVENTION

As can be seen on the drawings, the rotor consists of two outer layers for which layers with U-shaped elements 5 (FIG. 3) or flat layers 15 (FIG. 5) are preferably used. A flat layer with slots 14 (FIGS. 4, 5) is used as the intermediate layer 13. In a case where a flat intermediate layer is used, the section of the internal cooling channels may be increased to the external lateral surface of the rotor at the expense of decreasing the width of "reinforcing ribs" or increasing the width of the slots 14 in the intermediate layer 13 toward the external lateral surface of the rotor, as shown in FIG. 5.

EXAMPLE 1

Figure 5:
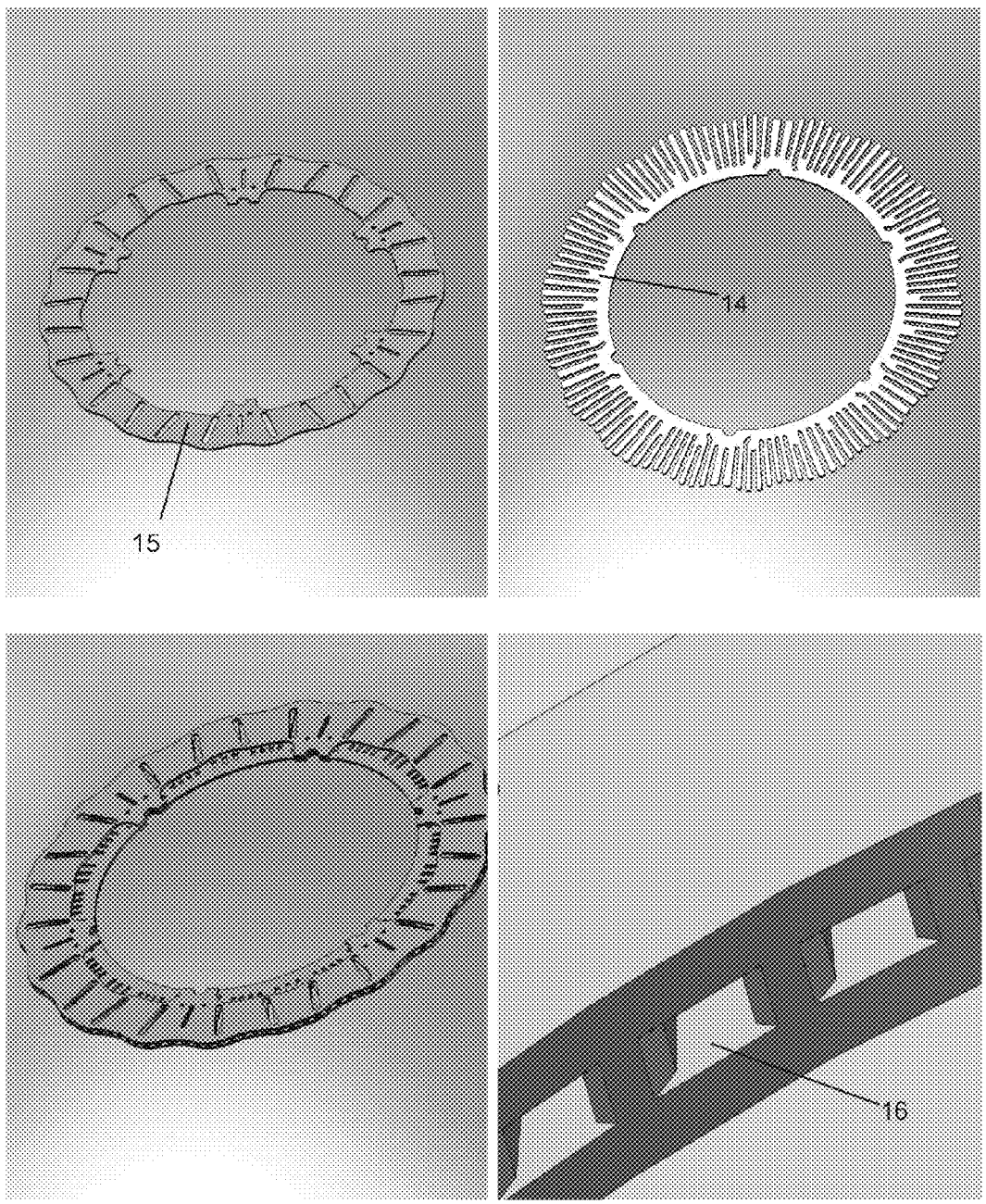
FIG. 5 shows a rotor made of three flat layers with the intermediate layer having slots, protruding radially outward beyond the internal lateral surface of the outer layers; 15—outer flat layer, 16—section of the internal through cooling channel section expanding from within to the external lateral boundary of the rotor (enlarged view).

According to the claimed technical solution, front brake disc rotors were produced with three flat layers: the flat outer layers 15 with the initial thickness of 1.8 mm were made of Steel 20X13, the flat intermediate layer 13 with the thickness of 2 mm was made of Steel 20 (see FIG. 5). The outer layers were made by sheet punching, and the slots in the intermediate layer 14 were made by laser cutting; shot blasting of all the layers was carried out with steel balls having diameter app 0.2 mm before assembly, which enables to provide a developed rough surface. Then the layers were rigidly connected into permanent connection by resistance-spot welding and mechanically worked to the total thickness of 5.0 mm. As a result, the finished rotor had the radially directed internal through cooling channels with the width of 5.0 mm and the height of 2.0 mm; the average width of the "reinforcing ribs" between the channels was alternatively (in the circumferential direction) 5.2 mm and 3.7 mm (the width of the "reinforcing ribs" slightly varied radially, to compensate the difference in the lengths of the circumferences of different diameters). The outer layers were connected between them and with the intermediate layer by resistance-spot welding through the intermediate layer reinforcing ribs with the width of 5.2 mm (2 "spots" for each reinforcing rib with the width of 5.2 mm, the diameter of the welding spot core was ~4.5 mm). The internal through cooling channels expand to the width of ~7.5 mm toward the external side boundary of the rotor (external diameter 310 mm), the rate of the channel width expansion is 1.5 mm/mm, i.e., the channel expands with half-angle of ~37° for along last 1.5 mm to the radially external lateral surface of the rotor. The intermediate layer of the rotor was made protruding radially outward beyond the internal lateral surface of the outer layers, the average width of the rotor outer layers (and the length of the internal through cooling channels) was 30 mm.

Furthermore, motorcycle brake disc rotors of similar design were made according to the invention, but they had no expansion of the internal through cooling channels toward the external side boundary of the rotor.

For the sake of comparison standard one-piece rotors with the thickness of 5.0 mm were made of the same Steel 20X13, the rotor design is similar to that of the rotor outer layers according to the invention.

The rotor according to the claimed invention weighs by 20% less that the standard one. After assembly of the floating brake disc for the motorcycle front wheel (identical aluminum carriers and bushings were used) the weight difference was 17%.

During full-scale tests (10 accelerations to the speed of 150 km/h, movement for app. 10 seconds at this speed and braking to the full stop, duration of one cycle 22-25 seconds, the weight of the motorcycle with a test racer was 265 kg, the tests were repeated 10 times with 10-minute break for full cooling of the rotors) heating of the rotor according to the invention with the channels expanding toward the external side boundary of the rotor did not exceed 325° C., heating of the rotor with the channels of permanent section was 345° C., while conventional rotors were heated to the temperature of >420° C., and the standard rotor was heavier. Decrease of the weight and the moment of inertia of the rotor (brake disc) contributes to better maneuverability of a motorcycle as well as to better dynamics of acceleration and braking.

EXAMPLE 2

Figure 1:
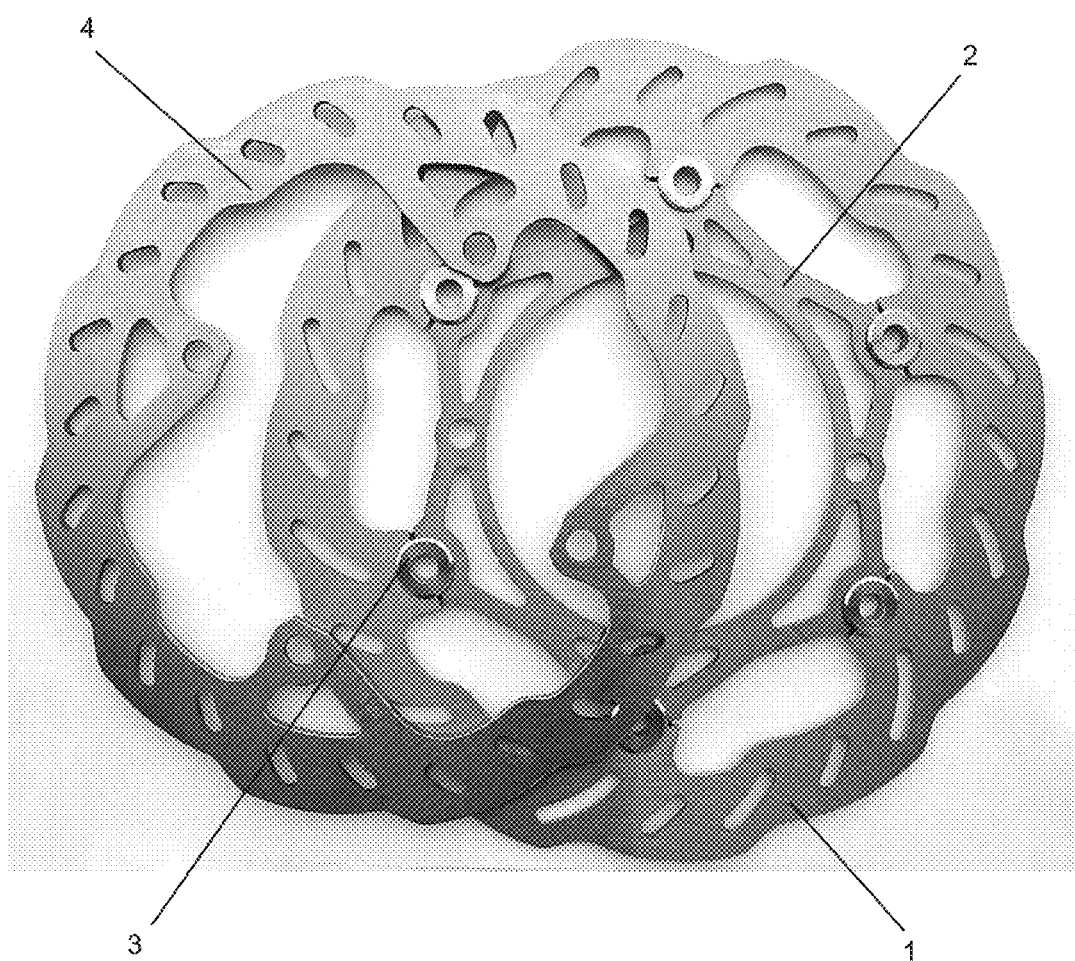
FIG. 1 shows brake discs for the front and rear wheels of a motorcycle from the prior art that are produced by SPACEK PRODUCT company (Czech Republic); 1—brake disc rotor for the motorcycle front wheel, 2—aluminum carrier of the front brake disc, 3—coupling bushings of a floating front brake disc, 4—brake disc rotor for the motorcycle rear wheel.
Figure 2:
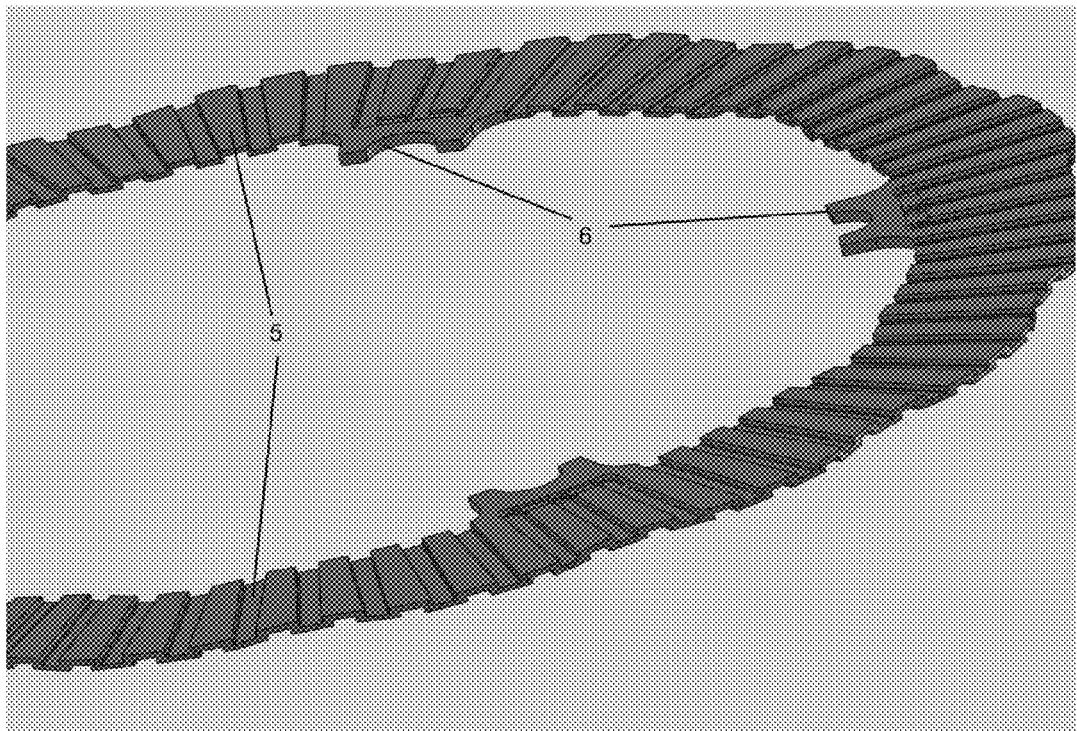
FIG. 2 shows a general view of a layer with U-shaped elements; 5—layer with U-shaped elements, 6—regions which coupling bushings are attached to, 7—friction surfaces, 8—connecting surfaces, 9—side walls.
Figure 2:
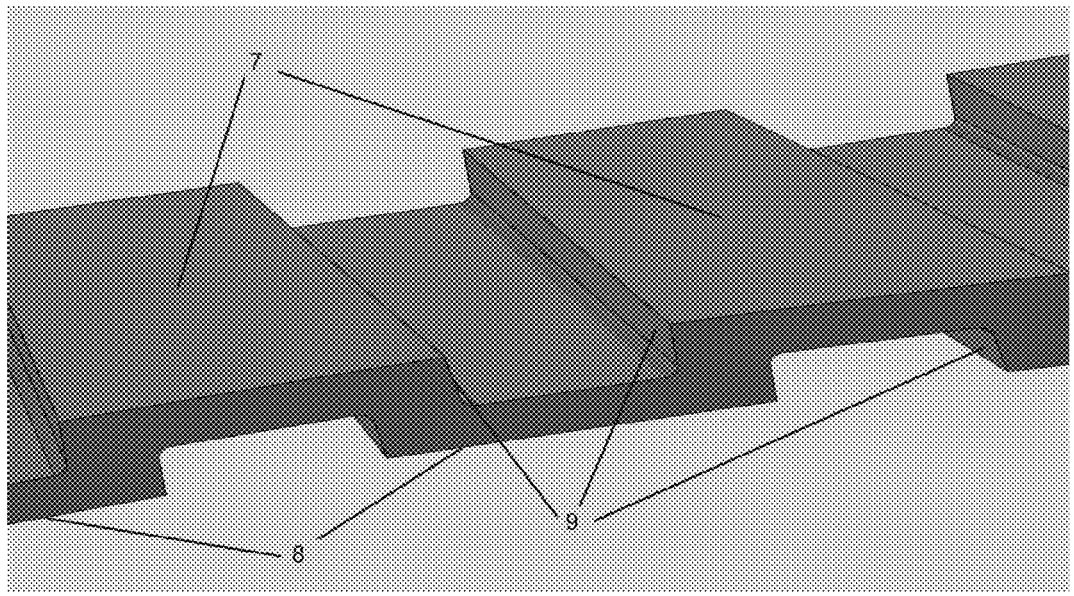
Figure 3:
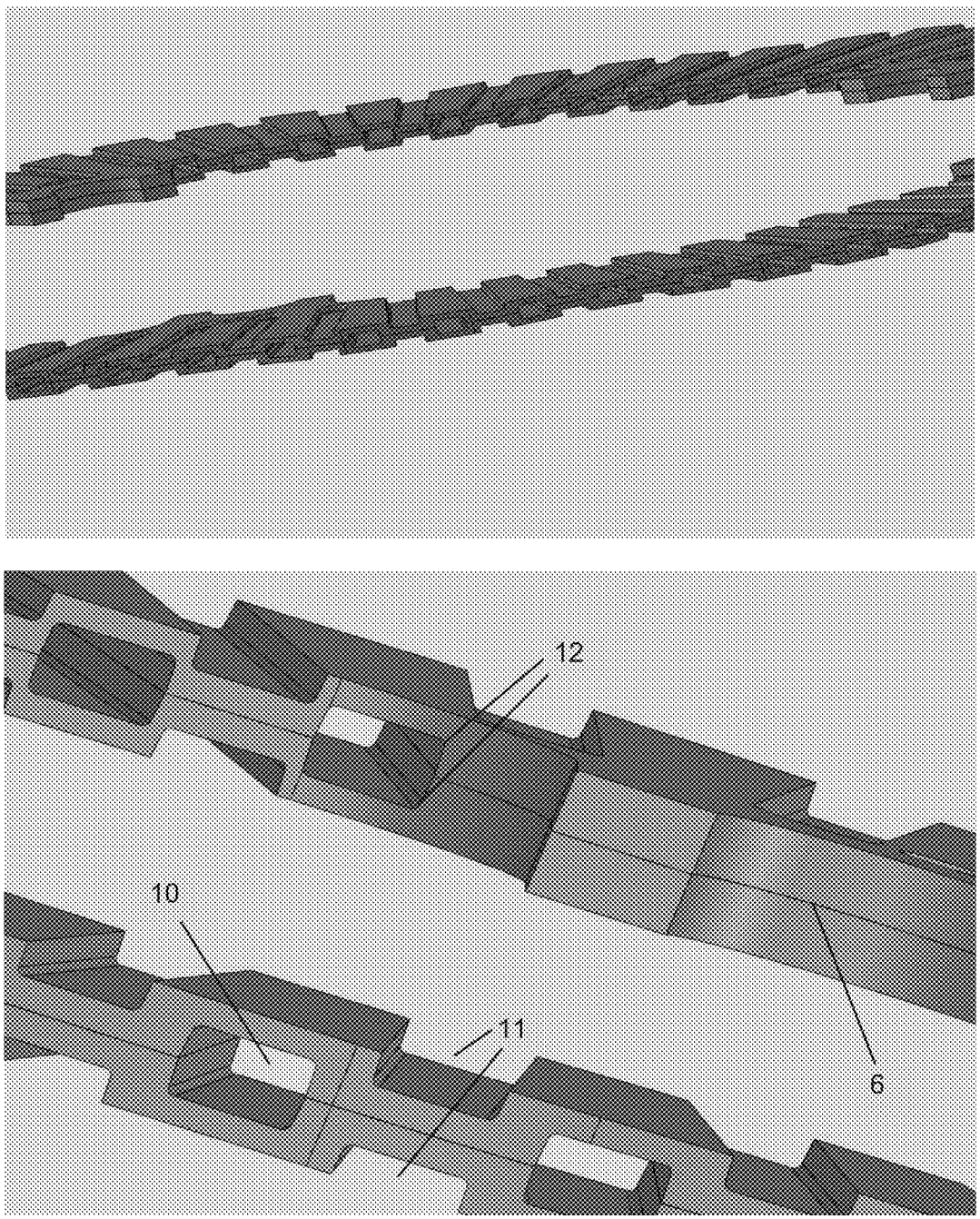
FIG. 3 shows a motorcycle brake disc rotor consisting of two identical layers with U-shaped elements, 10—internal through cooling channels, 11—external through cooling channels, 12—areas of maximum stresses during operation of the rotor.
Figure 4:
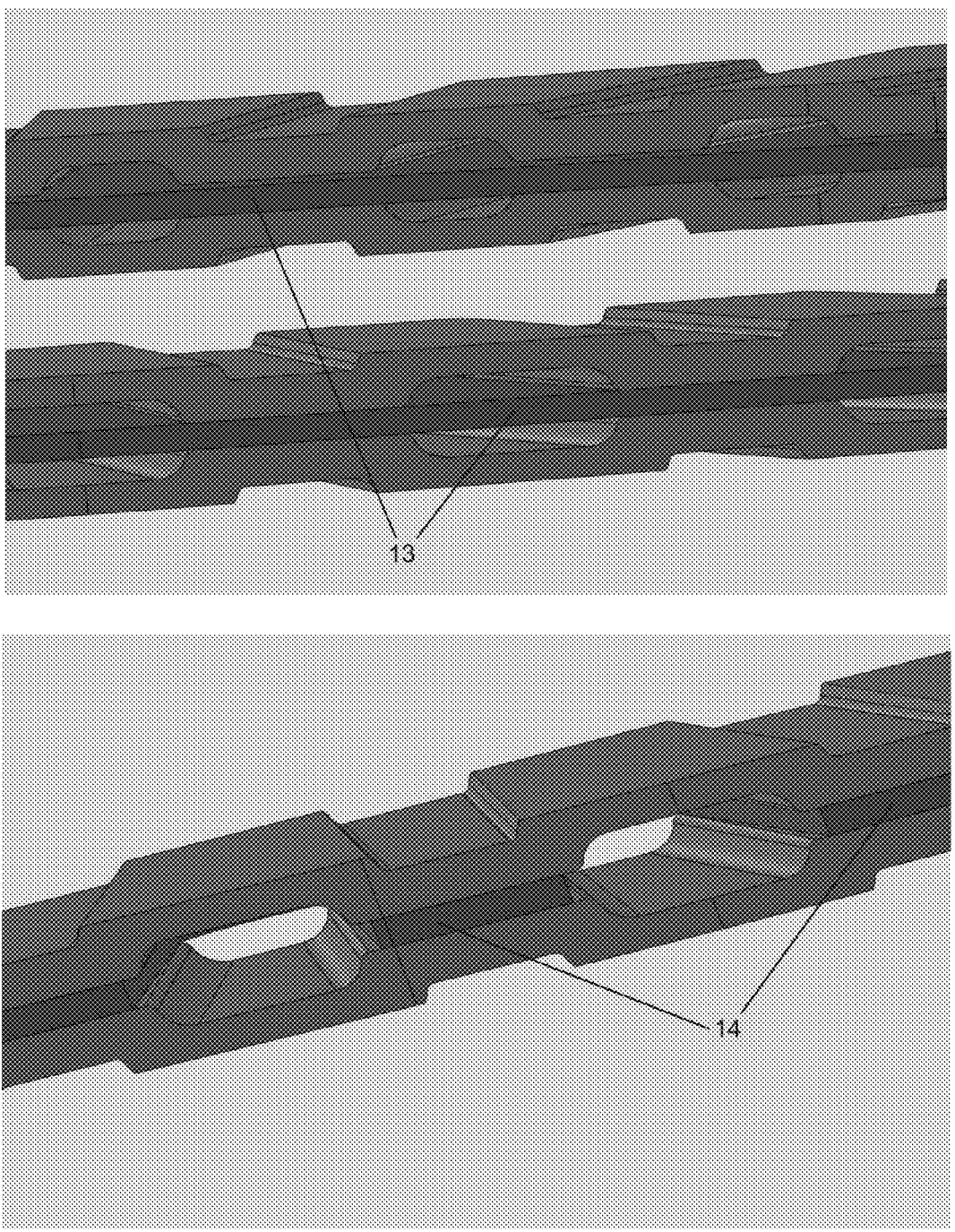
FIG. 4 shows a rotor composed of identical outer layers with U-shaped elements and a flat intermediate layer and an embodiment of this rotor with slots in the flat intermediate layer according to the invention; 13—flat intermediate layer, 14—flat intermediate layer with slots (one of the embodiments according to the invention).

According to the claimed technical solution, front brake disc rotors were made, which consisted of two identical layers with substantially U-shaped elements 5 made of Steel 20X13 (see FIGS. 2, 3). Each of the two layers was made by milling of source sheets with the thickness of 3.0 mm, a tapered cutter was used with the angle of 7°, the diameter of 3.7 mm at the flat working end and the edge rounding radius 0.3 mm. Before rigid assembly each layer had the total height of 2.7 mm with the layer material thickness of 1.7 mm in the area of projections (that, in their totality, make up the rotor friction surface), the layer material thickness of 1.5 mm in the area of recesses (which, in their totality, ensure rigid connection between the layers and form "the bottom" of the external through cooling channels 11), the projection and recess side walls thickness of 1.4 mm. The friction surface widths (in the circumferential direction) were ~7 mm, and the width of the external through cooling channels was ~4 mm (the width of the friction surfaces increased from the radially internal lateral surface to the radially external lateral surface of the rotor side boundary, to compensate the difference in the lengths of the circumferences of different diameters).

The layers, which were preliminarily made separately from each other, were rigidly connected into the permanent article by resistance-spot welding. Welding was carried out in the area of connecting surfaces 8 (i.e., through "the bottom" of the external through cooling channels 11), two welding spots for each surface, the welding spot core diameter was ~3 mm. In order to create a developed rough surface in one embodiment the assembled rotor was shot blasted with steel balls having a diameter app. 0.5 mm, no shot blasting was carried out in another embodiment. Then the assembled rotor was machined by grinding to the thickness of 5.0 mm (the metal depth of ~0.2 mm was removed on the friction surfaces), as the result, the final thickness of the friction regions of the rotor external surface was 1.5 mm.

The weight of the rotor according to the claimed invention with radially directed internal and external through cooling channels was equal to 65% of the weight of the standard rotor (Example 1). After assembly of the floating brake disc for the motorcycle front wheel (identical aluminum carriers and bushings were used) the weight difference was 30%.

During the full-scale tests similar to those described in Example 1 heating of the rotor in the embodiment without shot blasting did not exceed 330° C., and that of the rotor with shot blasting was 310° C. in comparison to that >420° C. for significantly heavier one-piece standard rotors.

EXAMPLE 3

According to the claimed technical solution, rear brake disc rotors were made, which consisted of three flat layers: the flat outer layers 75 with the initial thickness of 1.8 mm were made of Steel 20X13, the flat intermediate layer 13 with the thickness of 2 mm was made of Steel 20. The outer layers were made by mechanical working of source sheets, and the slots 14 in the intermediate layer were made by laser cutting; before assembly shot blasting of all the layers was carried out with steel balls having a diameter of app. 0.2 mm, which enabled to create a developed surface. Then, the layers were rigidly connected by gluing and mechanically worked to the total thickness of 5.0 mm.

In the result, the finished rotor had the internal through cooling channels with the length of app. 30 mm, which were directed at the angle of 10° to the radius, with the width of 5.0 mm and the height of 2.0 mm; the width of "the reinforcing ribs" between the channels was alternately (in the circumferential direction) 5.2 mm and 3.7 mm (the width of "reinforcing ribs" on the radius varied slightly, thus compensating the difference in the lengths of the circumferences of different diameters). The internal through cooling channels expand to the width of ~7.0 mm toward the external side boundary of the rotor (external diameter 220 mm), the rate of the channel width expansion is 1.0 mm/mm, i.e., the channel expands at the half-angle of ~26° for 2 mm to the radially external lateral surface of the rotor.

For the sake of comparison standard one-piece rotors with the thickness of 5.0 mm were made of the same Steel 20X13, the rotor design corresponded to that of the rotor outer layers according to the invention.

The weight of the rotor according to the claimed invention was equal to ≈84% of the weight of the rotor made according to the prototype.

During the full-scale tests similar to those described in Example 1 heating of the rotor made according to the invention with the channels expanding toward the external side boundary of the rotor did not exceed 220° C., while a conventional rotor (brake disc) for the motorcycle rear wheel heated to >270° C., and the standard rotor was significantly heavier.

The lower temperature of the rotor heating shows that it is possible to decrease rotor's size and, respectively, weight and moment of inertia. It is important that even small reduction of the rotor diameter, e.g., by 10% (for example, from 310 mm to 280 mm for the brake disc rotor of the motorcycle front wheel), will ensure additional reduction of its weight by the same amount (app. 10%), and the moment of inertia will be decreased by ~35%. Furthermore, lowering the temperature of the rotor will increase its service life as well as the service life of brake pads. Reduction of the size and weight of conventional rotors will result in their overheating at once (as well as to overheating of brake pads and, possibly, to overheating of brake fluid), which is inadmissible subject to the requirement of considerable service life that is necessary for components of production motorcycles.

It should be also noted that the rotor according to the claimed technical solution has a minimum thermal gradient along its section (along thickness) and, respectively, minimum thermal deformations and warpage in comparison to conventional non-ventilated rotors for motorcycle brake discs, which is conditioned by significantly more efficient cooling, namely of the rotor medium portion. It is associated with the fact that the thickness of the friction layer of the claimed rotor in optimal operation conditions is 1.4-1.7 mm, and in standard rotors of motorcycle brake discs is 5 mm, that is ~3 times more. The time for receiving steady temperature distribution in a layer with a thickness h that is heated on one side (heat is generated on friction surfaces during braking) is $\sim h^2/\chi$ where $\chi$ is the temperature conductivity of a material ([1]), for a stainless steel of 20X13 type the value of $\chi$ is 0.07 cm2/s. Thus, for the claimed rotor of motorcycle brake disc the characteristic time of temperature establishment in a friction layer is ~s (even at the speed of 150 km/h this time corresponds to three wheel turns only) and is multiple less than braking time taking, especially for high initial speed, 3-4 seconds or more. This means that thermal deformations of the claimed rotor correspond to a small temperature difference between its outer and inner layers, and even during braking it is heated practically uniformly, as one piece.

Also, it should be noted that the highest speed of the rotor cooling is realized, in comparison with conventional ventilated rotors, in an embodiment of the rotor consisting of two layers with substantially U-shaped elements, the claimed rotor having a minimum weight and substantial, as compared to the known variant, improvement of its manufacturability.

Thus, the technical effect of the claimed invention is improvement of manufacturability of a ventilated rotor with internal through cooling channels together with reduction of its weight and moment of inertia as well as increasing its cooling speed enabling to reduce temperature to which a rotor is heated during operation. The technical effect enables to simultaneously reduce substantially mutually exclusive parameters such as weight of a rotor and its operating temperature; usually, in order to lower the rotor temperature, it is necessary to reduce its weight. Lowering of the rotor temperature, which is conditioned by its faster cooling, improves its operating conditions as well as operating conditions of brake pads (due to lowering temperature in the area of contact between the pads and the rotor).

In order to fulfill any possible particular requirements, variations in the above-described embodiments of the motorcycle brake disc rotor may be made that will be obvious for those skilled in the art as well as modifications or replacement of some elements by other elements performing the equivalent function, but without departing from the provisions protected by the appended claims.

What is claimed is:

1. A motorcycle brake disc rotor comprising:
at least two layers, rigidly connected to each other, wherein each layer is a one-piece part made separately and has a radially external lateral surface and a radially internal lateral surface, opposite annular friction surfaces formed by outer surfaces of the outermost at least two layers, internal cooling through channels for cooling the rotor, formed in at least one of the at least two layers, extending from the radially external lateral surface to the radially internal lateral surface so as to direct air flow substantially in a radial direction and having a length defined by a distance between said lateral surfaces,
wherein a width of the internal cooling through channels does not exceed 25% of the length thereof, and
wherein said width increases in the direction to the radially external lateral surface by up to 1.5 mm per 1 mm of a distance, said distance limited to 3 mm from the radially external lateral surface.

2. The rotor of claim 1 wherein a distance between the opposite annular friction surfaces is 4 to 7 mm.

3. The rotor of claim 1 wherein a ratio of a distance between axes of the internal cooling through channels to the width thereof does not exceed 4, preferably does not exceed 2.

4. The rotor of claim 1 wherein the internal cooling through channels have a variable cross-section, wherein a varation of the width of the internal cooling through channel except of said distance does not exceed 5 % of an average value of the width.

5. The rotor of claim 4 wherein the width and/or a height of the internal cooling through channels increases in direction from the radially internal lateral surface to radially external lateral surface.

6. The rotor of claim 5 wherein an increase of the width and/or a height of the internal cooling through channels does not exceed 1.5 mm, preferably does not exceed 1 mm, per 1 mm of a distance along the internal cooling through channels.

7. The rotor of claim 1 wherein through slots are made in at least one of the layers.

8. The rotor of claim 1 further comprising an intermediate layer between said two outermost layers.

9. The rotor of claim 8 wherein the intermediate layer is made of a material different from a material of the two outer layers.

10. The rotor of claim 8 wherein the intermediate layer has a thermal conductivity and temperature conductivity each being higher respectively than thermal conductivities and temperature conductivities of the two outermost layers.

11. The rotor of claim 8 wherein the intermediate layer has lower density than that of the two outer layers.

12. The rotor of claim 8 wherein the two outer layers are made flat.

13. The rotor of claim 8 wherein at least one of a radially external lateral surface and a radially internal lateral surface of the intermediate layer protrudes radially outward of the radially external lateral surfaces and the radially internal lateral surfaces of the two outer layers respectively.

14. The rotor of claim 13 wherein at least one of a radially external lateral surface and a radially internal lateral surface of the intermediate layer has a rough surface and/or provided with a coating facilitating heat exchange/heat transfer.

15. The rotor according to claim 8 wherein the two outer layers are made identical.

16. The rotor of claim 1 wherein the layers are connected by soldering, and/or welding, and/or gluing.

17. The rotor of claim 1 further comprising external cooling through channels, and wherein walls of the external cooling through channels are made with a rough surface and/or provided with a coating facilitating heat exchange/heat transfer.

* * * * *